(12) United States Patent
Li et al.

(10) Patent No.: US 10,725,744 B2
(45) Date of Patent: Jul. 28, 2020

(54) METHOD FOR ADAPTING TO BLOCKCHAIN AND DEVICE, TERMINAL AND MEDIUM PERFORMING THE SAME

(71) Applicant: Silver Rocket Data Technology (Shanghai) Co., Ltd, Shanghai (CN)

(72) Inventors: Jia Li, Shanghai (CN); Yi Yuan, Shanghai (CN); Xiaoliang Pan, Shanghai (CN); Wei Zhang, Shanghai (CN)

(73) Assignee: Silver Rocket Data Technology (Shanghai) Co., Ltd, Shanghai (CN)

( * ) Notice: Subject to any disclaimer, the term of this patent is extended or adjusted under 35 U.S.C. 154(b) by 0 days.

(21) Appl. No.: 16/726,777

(22) Filed: Dec. 24, 2019

(65) Prior Publication Data

US 2020/0210148 A1     Jul. 2, 2020

(30) Foreign Application Priority Data

Dec. 27, 2018  (CN) .......................... 2018 1 1611346
Dec. 27, 2018  (CN) .......................... 2018 1 1611359
Dec. 27, 2018  (CN) .......................... 2018 1 1611365
Dec. 27, 2018  (CN) .......................... 2018 1 1613014

(51) Int. Cl.
   *G06F 8/10*      (2018.01)
   *G06F 16/23*     (2019.01)
   *G06F 8/77*      (2018.01)

(52) U.S. Cl.
   CPC .................. *G06F 8/10* (2013.01); *G06F 8/77* (2013.01); *G06F 16/2379* (2019.01)

(58) Field of Classification Search
   CPC ..................................... G06F 8/10; G06F 8/77

USPC ......................................................... 717/101
See application file for complete search history.

(56) References Cited

U.S. PATENT DOCUMENTS

| 10,396,997 | B2* | 8/2019 | Brady ..................... H04L 67/34 |
| 10,649,429 | B2* | 5/2020 | Orsini .................... G06Q 50/06 |
| 2017/0075662 | A1* | 3/2017 | Eksten ...................... G06F 8/70 |
| 2018/0157825 | A1* | 6/2018 | Eksten .................. H04L 9/3239 |

(Continued)

FOREIGN PATENT DOCUMENTS

WO   WO-2019072297 A2 *  4/2019 ............. G06F 21/64

OTHER PUBLICATIONS

Peter E. Sedgewick et al. "Self-adaptation made easy with Blockchains"; 2018 ACM/IEEE 13th International Symposium on Software Engineering for Adaptive and Self-Managing Systems—SEAMS 2018, May 28-29, 2018, Gothenburg, Sweden.*

(Continued)

*Primary Examiner* — Francisco J Aponte
(74) *Attorney, Agent, or Firm* — Fideli Law PLLC

(57) ABSTRACT

The present disclosure discloses a method for adapting to blockchain and device, terminal and medium performing the same. The method comprising: receiving a development requirement including a blockchain communication requirement of a target blockchain from a plurality of candidate blockchains associated with the processor and a target language associated with the target blockchain; and providing a SDK corresponding to the target language based on the development requirement, wherein the SDK includes a calling interface corresponding to the development requirement, the calling interface being configured to trigger a communication channel to communicate with the target blockchain.

16 Claims, 16 Drawing Sheets

(56) References Cited

U.S. PATENT DOCUMENTS

| | | | |
|---|---|---|---|
| 2018/0285996 A1* | 10/2018 | Ma | G06Q 50/184 |
| 2018/0329693 A1* | 11/2018 | Eksten | G06F 16/21 |
| 2019/0026146 A1* | 1/2019 | Peffers | G06F 9/466 |
| 2019/0066068 A1* | 2/2019 | Mitchell | G06Q 20/401 |
| 2019/0080392 A1* | 3/2019 | Youb | G06Q 40/00 |
| 2019/0102409 A1* | 4/2019 | Shi | G06F 16/27 |
| 2019/0102423 A1* | 4/2019 | Little | G06F 9/547 |
| 2019/0104196 A1* | 4/2019 | Li | G06Q 20/06 |
| 2019/0164153 A1* | 5/2019 | Agrawal | H04L 9/3218 |
| 2019/0171438 A1* | 6/2019 | Franchitti | G06F 16/9538 |
| 2019/0205884 A1* | 7/2019 | Batra | G06Q 20/3827 |
| 2019/0279206 A1* | 9/2019 | Song | G06F 16/1824 |
| 2019/0327079 A1* | 10/2019 | Nandakumar | H04L 9/006 |
| 2019/0363873 A1* | 11/2019 | Fry | G06Q 40/04 |
| 2019/0392178 A1* | 12/2019 | Rice | H04L 63/00 |
| 2020/0007311 A1* | 1/2020 | Oberhofer | H04L 63/102 |
| 2020/0007322 A1* | 1/2020 | Weldemariam | G06F 16/27 |
| 2020/0019936 A1* | 1/2020 | Irazabal | G06Q 20/36 |
| 2020/0034448 A1* | 1/2020 | Sato | G06F 16/134 |
| 2020/0034453 A1* | 1/2020 | Sato | G06F 16/18 |
| 2020/0034469 A1* | 1/2020 | Sato | G06F 16/258 |
| 2020/0059430 A1* | 2/2020 | Trautmann | H04L 69/22 |
| 2020/0076572 A1* | 3/2020 | Irazabal | H04L 9/0637 |
| 2020/0076573 A1* | 3/2020 | Deshpande | G06F 16/9024 |
| 2020/0076608 A1* | 3/2020 | Irazabal | H04L 9/3236 |
| 2020/0134711 A1* | 4/2020 | Dawson | H04L 9/0637 |
| 2020/0143496 A1* | 5/2020 | Saito | G06Q 50/18 |
| 2020/0160334 A1* | 5/2020 | Alba | G06Q 20/401 |

OTHER PUBLICATIONS

Bc. Branislav Smik; "Blockchain technologies adapted for data manipulation in IoT"; Masaryk University Faculty of Informatics—2018.*

Olivia Choudhury et al.; "Auto-Generation of Smart Contracts from Domain-Specific Ontologies and Semantic Rules"; IBM Research; Research Gate—Conference Paper • Sep. 2018.*

Maher Alharby et al.; "Blockchain-Based Smart Contracts : A Systematic Mapping Study"; AIS, CSIT, IPPR, IPDCA—2017; pp. 125-140, 2017. © CS & IT-CSCP 2017.*

* cited by examiner

S31 — Parsing the triggering operation on the calling interface in response to the triggering operation and determining the target blockchain and blockchain communication requirement of the target blockchain, wherein the target blockchain is a blockchain to be communicated S32 — Calling an adapter corresponding to the target blockchain and conducting communication with the target blockchain, wherein the communication meets the communication requirement of the target blockchain

FIG. 4

METHOD FOR ADAPTING TO BLOCKCHAIN AND DEVICE, TERMINAL AND MEDIUM PERFORMING THE SAME

CLAIM OF PRIORITY

This application claims priority to Chinese Application number 201811611346.X, filed on Dec. 27, 2018, Chinese Application number 201811611359.7, filed on Dec. 27, 2018, Chinese Application number 201811611365.2, filed on Dec. 27, 2018 and Chinese Application number 201811613014.5, filed on Dec. 27, 2018, which are incorporated herein by reference.

TECHNICAL FIELD

The present disclosure relates to computer technologies, and more particularly, but not exclusively, to a method for adapting to blockchain and device, terminal and medium thereof.

BACKGROUND

With the vigorous development of blockchain technology, the development efficiency of the blockchain application and the improvement of the user experience for interacting with the blockchain become an urgent problem to be solved.

SUMMARY

The technical problem solved by the embodiment of the present disclosure is to improve the development efficiency of the blockchain application and the user experience for interacting with the blockchain.

To solve the above-mentioned technical problem, an aspect of the present disclosure provides a method for adapting to blockchains, including receiving a development requirement including a blockchain communication requirement of a target blockchain from a plurality of candidate blockchains associated with the processor and a target language associated with the target blockchain; and providing a software development kit (hereinafter "SDK") corresponding to the target language based on the development requirement, wherein the SDK includes a calling interface corresponding to the development requirement, the calling interface being configured to trigger a communication channel to communicate with the target blockchain.

In some embodiments, the method also including receiving a triggering operation on the calling interface; receiving data from the calling interface in response to the triggering operation; obtaining blockchain standard data based on the data received from the calling interface, wherein the blockchain standard data meets a data criterion of the target blockchain; and transmitting the blockchain standard data to the target blockchain.

In some embodiments, the method also including receiving a triggering operation on the calling interface: determining the target blockchain and the blockchain communication requirement of the target blockchain based on the triggering operation; calling an adapter corresponding to the target blockchain; and conducting with the target blockchain a communication that meets the communication requirement of the target blockchain.

In some embodiments, the blockchain communication requirement of the target blockchain includes information of a smart contract to be operated, and the calling interface corresponds to operations of the smart contract.

In some embodiments, the information of the smart contract includes a data interaction requirement of the smart contract, and In some embodiments, the method further including generating a smart contract template corresponding to the data interaction requirement, the smart contract template including an input data field of the target blockchain based on the data interaction requirement, an output data field, and an operation name of the smart contract template.

In some embodiments, the method further including: operating the smart contract via a smart contract interface in response to a triggering operation on the smart contract interface, the smart contract interface being a calling interface corresponding to the operation of the smart contract interface.

In some embodiments, the providing of the SDK corresponding to the target language based on the development requirement includes: generating an adapter for communicating with the target blockchain.

In some embodiments, the development requirement is written in a preset blockchain definition language, and the providing of the SDK corresponding to the target language based on the development requirement includes: obtaining compiled information by compiling the development requirement based on the requirements of the blockchain definition language: and generating the SDK of the target language based on the compiled information.

In some embodiments, the development requirement further includes information of a smart contract, and In some embodiments, the method further including: generating a smart contract template corresponding to the target blockchain according to the compiled information, the smart contract template including an input data field of a blockchain determined by a data interaction requirement, an output data field, and an operation name of the smart contract template.

Another aspect of the present disclosure provides a device, including at least one storage medium including a set of instructions for adapting to blockchains; and at least one processor in communication with the at least one storage medium, wherein when executing the set of instructions, the at least one processor: receives a development requirement including a blockchain communication requirement of a target blockchain from a plurality of candidate blockchains associated with the processor and a target language associated with the target blockchain; and provides a software development kit (SDK) corresponding to the target language based on the development requirement, wherein the SDK includes a calling interface corresponding to the development requirement, the calling interface being configured to trigger a communication channel to communicate with the target blockchain.

In some embodiments, the at least one processor further: receives a triggering operation on the calling interface; receives data from the calling interface in response to the triggering operation; obtains blockchain standard data based on the data received from the calling interface, wherein the blockchain standard data meets a data criterion of the target blockchain; and transmits the blockchain standard data to the target blockchain.

In some embodiments, the at least one processor further: receives a triggering operation on the calling interface; determines the target blockchain and the blockchain communication requirement of the target blockchain based on the triggering operation; calls an adapter corresponding to the target blockchain; and conducts with the target blockchain a communication that meets the communication requirement of the target blockchain.

In some embodiments, the blockchain communication requirement of the target blockchain includes information of a smart contract to be operated, and the calling interface corresponds to operations of the smart contract.

In some embodiments, the information of the smart contract includes a data interaction requirement of the smart contract, and wherein the at least one processor further: generates a smart contract template corresponding to the data interaction requirement, the smart contract template including an input data field of the target blockchain based on the data interaction requirement, an output data field, and an operation name of the smart contract template.

In some embodiments, the at least one processor further: operates the smart contract via a smart contract interface in response to a triggering operation on the smart contract interface, the smart contract interface being a calling interface corresponding to the operation of the smart contract interface.

In some embodiments, the providing of the SDK corresponding to the target language based on the development requirement includes: generating an adapter for communicating with the target blockchain.

In some embodiments, the development requirement is written in a preset blockchain definition language, and the providing of the SDK corresponding to the target language based on the development requirement includes: obtaining compiled information by compiling the development requirement based on the requirements of the blockchain definition language; and generating the SDK of the target language based on the compiled information.

In some embodiments, the development requirement further includes information of a smart contract, and the at least one processor further: generates a smart contract template corresponding to the target blockchain according to the compiled information, the smart contract template including an input data field of a blockchain determined by a data interaction requirement, an output data field, and an operation name of the smart contract template.

In another aspect of the present disclosure provides a non-transitory storage medium, including a set of instructions for adapting to blockchains, wherein when the set of instructions is executed by a processor, the set of instructions directs the processor to conduct: receiving a development requirement including a blockchain communication requirement of a target blockchain from a plurality of candidate blockchains associated with the processor and a target language associated with the target blockchain; and providing a software development kit (SDK) corresponding to the target language based on the development requirement, wherein the SDK includes a calling interface corresponding to the development requirement, the calling interface being configured to trigger a communication channel to communicate with the target blockchain.

In some embodiments, when the set of instructions is executed by a processor, the set of instructions further directs the processor to conduct: receiving a triggering operation on the calling interface; receiving data from the calling interface in response to the triggering operation; obtaining blockchain standard data based on the data received from the calling interface, wherein the blockchain standard data meets a data criterion of the target blockchain; and transmitting the blockchain standard data to the target blockchain.

The present disclosure also provides a data processing method, comprising: generating display data according to a manner in which a smart contract interacts with a blockchain and a parameter name included in the interaction data, the interaction data being selected from data interacting with the blockchain through the smart contract; and displaying an user interface based on the display data in response to a display request.

In some embodiments, the generating the display data according to the manner in which the smart contract interacts with the blockchain and a parameter name included in the interaction data comprises: obtaining page information from the blockchain, the page information includes the interaction data; obtaining interaction data between the smart contract and the blockchain by filtering the page information according to a format of the page information; determining an information filtering template according to the manner in which the smart contract interacts with the blockchain and the parameter name included in the interaction data; filtering the page information by using the information filtering template to obtain the filtered information and the corresponding text description, wherein the text description is determined according to the parameter name and the manner of the interaction; splicing the filtered information and the corresponding text description; and determining the display data according to the spliced data.

In some embodiments, the smart contract includes a preset smart contract; the generating the display data according to the manner in which the smart contract interacts with the blockchain and a parameter name included in the interaction data comprises: determining a manner in which the preset smart contract interacts with the blockchain and interaction data.

In some embodiments, the filtering the page information by using the information filtering template comprises at least one of: filtering a state of the operation of interacting with the blockchain and a value corresponding to the parameter name.

In some embodiments, the method further comprises: receiving the display request; determining, according to the display request, a network address of the page information.

In some embodiments, the display request is a request for viewing an order log, the display request includes order information; and determining, according to the display request, the network address of the page information comprises: obtaining the display request one or more network addresses corresponding to the order information.

In some embodiments, the display request includes a network address of the page information.

In some embodiments, obtaining the page information from the blockchain includes: obtaining the page information at a preset time point; the display data includes a plurality of data corresponding to the page information, the displaying the user interface based on the display data in response to the display request includes: determining data associated with the display request among the plurality of data; and displaying the data associated with the display request via the user interface.

In some embodiments, the generating the display data according to the manner in which the smart contract interacts with the blockchain and the parameter name included in the interaction data includes: in response to calling the interface of the smart contract, calling data interacting between the interface and the blockchain as the interaction data; generating the display data according to the manner in which the smart contract interacts with the blockchain and the parameter name included in the interaction data, and the manner in which the smart contract interacts with the blockchain is determined based on the interface; and recording the display data into a log file.

In some embodiments, the displaying the user interface based on the display data in response to the display request includes: obtaining data corresponding to the display request from the log file to display the user interface.

In some embodiments, the display request includes a request to view an order log; and the user interface based on the display data in response to the display request includes: determining, in the display data, data associated with the order to display.

In some embodiments, the display request includes a filtering condition, the filtering condition includes at least one of: a time period, order information, blockchain information, manner information interacting with the blockchain, parameter name information, and parameter content information; the displaying the user interface based on the display data in response to the display request includes: determining, in the display data, data associated with the filtering condition for display.

The technical solutions of the embodiment of the present disclosure have the following beneficial effects:

In the embodiments of the present disclosure, a method comprises: receiving a development requirement, the development requirement includes a blockchain communication requirement and a target language, and providing a SDK corresponding to the target language based on the development requirement, the SDK includes a calling interface corresponding to the development requirement, the calling interface is configured to trigger a communication channel to communicate with the blockchain. So that, the development process for communicating with blockchain in application development may be simplified, which may save application development time and improve the efficiency of application development by providing a SDK corresponding to the target language based on the development requirement and communicating with the blockchain through the SDK.

Further, by parsing the triggering operation on the calling interface, determining a target blockchain and communication requirement and calling an adapter corresponding to the target blockchain to communicate, data in the communication request can be transmitted to the target block through the adapter, and thus the quality of communication with the target blockchain can be improved.

Further, according to the data interaction requirement of the smart contract, a corresponding smart contract template is generated, wherein the smart contract template includes an input data field of the blockchain determined by the data interaction requirement and an output data field, so that the specific service content is only written into a location corresponding to the input data field and the output data field, and the smart contract for the specific business can be generated, which can reduce the difficulty of generating the smart contract, can reduce the workload, and can improve the efficiency of application development.

Further, by operating the smart contract generated based on the smart contract template via a smart contract interface, the process of smart contract generation operations can be reduced, thereby improving the efficiency of application development Further, the blockchain communication requirement includes a target blockchain and the SDK includes an adapter for communicating with the target blockchain, which can make the SDK more targeted and reduce the space occupied by the SDK, and thus improving the efficiency of generating SDKs.

Further, by compiling the development requirement based on the requirements of the blockchain definition language and obtaining compiled information to generate the SDK of the development application based on the compiled information, the development requirement corresponding to different blockchain can be complied by a unified language, and the development process can be accelerated and the development efficiency can be improved compared to separately developing different blockchains Further, the smart contract template corresponding to the blockchain is generated by using the preset blockchain definition language to write the information of the smart contract, and the smart contract is generated based on the smart contract template. Then, for different blockchains, all the development requirement can be written in a preset blockchain definition language, which improving development efficiency. The generated smart contract template is based on the requirement information, which is more suitable for the service requirement of the application.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

FIG. 4 is a partial flowchart of another method for adapting to blockchain according to embodiments of the present disclosure;

DETAILED DESCRIPTION

Figure 1:
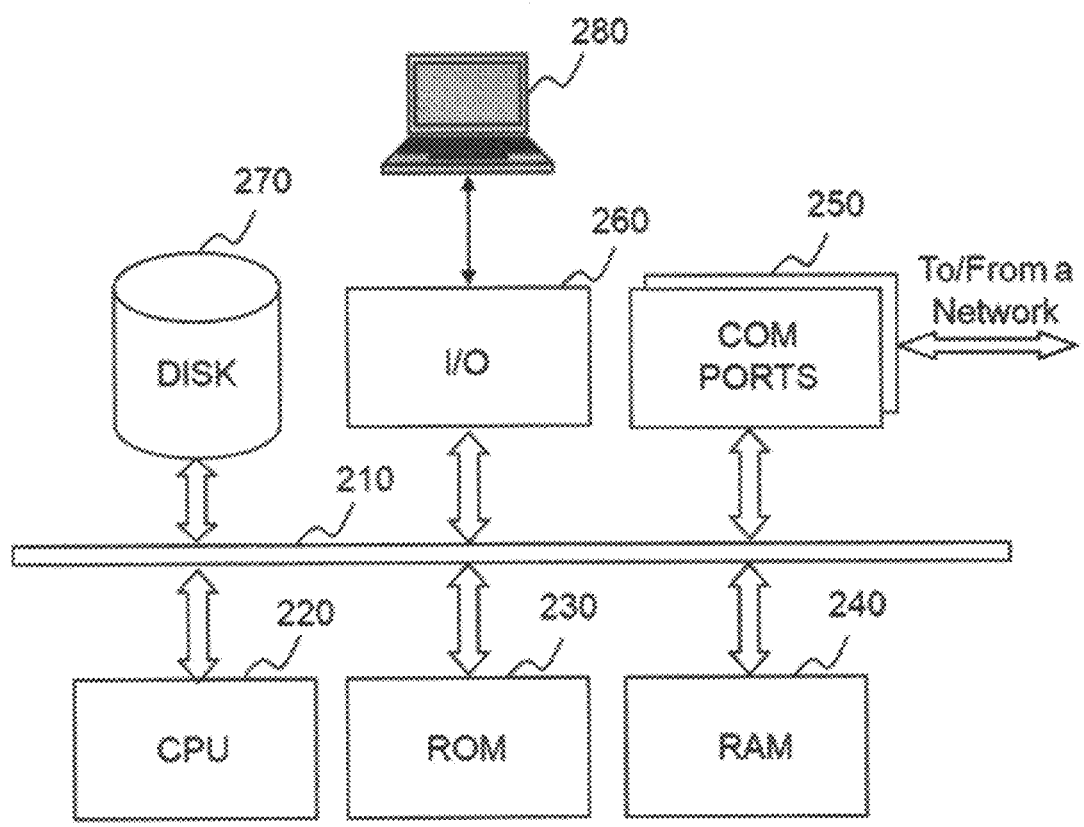
FIG. 1 is a block diagram illustrating an exemplary data processing device according to embodiments of the present disclosure.

Various aspects and examples of the disclosure will now be described. The following description provides specific details for a thorough understanding and enabling description of these examples. Those skilled in the art will understand, however, that the disclosure may be practiced without many of these details. Additionally, some well-known structures or functions may not be shown or described in detail, so as to avoid unnecessarily obscuring the relevant description.

The terminology used in the description presented below may be intended to be interpreted in its broadest reasonable manner, even though it may be being used in conjunction with a detailed description of certain specific examples of the disclosure. Certain terms may even be emphasized below, however, any terminology intended to be interpreted in any restricted manner will be overtly and specifically defined as such in this Detailed Description section.

As used herein, the singular forms "a," "an," and "the" may be intended to include the plural forms as well, unless the context clearly indicates otherwise. It will be further understood that the terms "comprises," "comprising." "includes." and/or "including" when used in this specification, specify the presence of stated features, integers, steps, operations, elements, and/or components, but do not preclude the presence or addition of one or more other features, integers, steps, operations, elements, components, and/or groups thereof.

The flowcharts used in the present disclosure illustrate operations that systems implement according to some embodiments in the present disclosure. It may be to be expressly understood, the operations of the flowchart may or may not be implemented in order. Conversely, the operations may be implemented in inverted order, or simultaneously. Moreover, one or more other operations may be added to the flowcharts. One or more operations may be removed from the flowcharts As described above, in prior blockchain technology applications, the efficiency of application development and the intuitive display of smart contract and blockchain data interaction to users have become urgent problems to be solved.

In some embodiments, communicating with blockchain is usually developed according to different characteristics of blockchain respectively, thus the development process is relatively complicated, and efficiency of software development is low. Also, in a blockchain-based data transaction, both parties of data transaction can check the data interaction between smart contracts with blockchain through the blockchain transaction addresses. While, the process is relatively complex by checking the data interaction between smart contracts with blockchain through the blockchain transaction addresses and users is difficult to understand the data content which they check.

In the embodiment of the present disclosure, a method comprises: receiving development requirement, the development requirement includes a blockchain communication requirement and a target language, and providing a SDK corresponding to the target language based on the development requirement, the SDK includes a calling interface corresponding to the development requirement, the calling interface is configured to trigger a communication channel to communicate with the blockchain. So that, the development process for communicating with blockchain in application development may be simplified, which may save application development time and improve the efficiency of application development by providing a SDK corresponding to the target language based on the development requirement and communicating with the blockchain through the SDK. In addition, display data is generated according to a manner in which the smart contract interacts with the blockchain and the parameter name included in the interaction data. The user interface is displayed based on the display data in response to the display request by generating the display data. Thereby, according to user's request, the user can view data and action interacting between the smart contracts and blockchain displayed by user interface by displaying data interacting between smart contract and blockchain via the user interface, which allows users to more intuitively view interaction records between smart contract and blockchain and thus improves the user experience.

The above-mentioned purposes, features and advantages will become more apparent from the detailed description of the embodiments.

FIG. 1 is a schematic diagram illustrating exemplary hardware components of a data processing device 200 according to some embodiments of the present disclosure.

The data processing device 200 may be a general-purpose computer or a special purpose computer. The data processing device 200, for example, may include COM ports 250 connected to and from a plurality of blockchains to facilitate data communications. The data processing device 200 may also include a central processing unit (CPU) 220, in the form of one or more processors, for executing program instructions. The exemplary computer platform may include an internal communication bus 210, program storage and data storage of different forms, for example, a disk 270, and a read only memory (ROM) 230, or a random-access memory (RAM) 240, for various data files to be processed and/or transmitted by the data processing device 200. The data processing device 200 may also include program instructions stored in the ROM 230, RAM 240, and/or other type of non-transitory storage medium to be executed by the CPU 220. The methods and/or processes of the present disclosure may be implemented as the program instructions. The data processing device 200 also includes an I/O component 260, supporting input/output between the computer and other components therein such as user interface elements 280. The data processing device 200 may also receive programming and data via network communications.

Merely for illustration, only one CPU and/or processor is described in the data processing device 200. However, it should be note that the data processing device 200 in the present disclosure may also include multiple CPUs and/or processors, thus operations and/or method steps that are performed by one CPU and/or processor as described in the present disclosure may also be jointly or separately performed by the multiple CPUs and/or processors. For example, if in the present disclosure the CPU and/or processor of the data processing device 200 executes both step A and step B, it should be understood that step A and step B may also be performed by two different CPUs and/or processors jointly or separately in the data processing device 200 (e.g., the first processor executes step A and the second processor executes step B, or the first and second processors jointly execute steps A and B).

Figure 2:
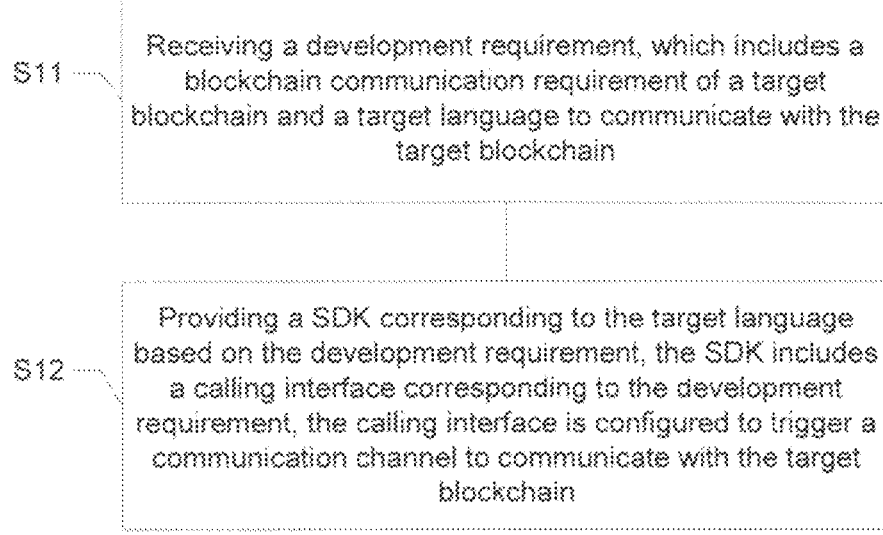
FIG. 2 is a flowchart of a method for adapting to blockchain according to embodiments of the present disclosure.

FIG. 2 is a flowchart of a method for adapting to blockchain according to embodiments of the present disclosure. The method may be stored in a form of a set of instructions in the non-transitory storage medium of the data processing device 200, and may be executed by the processor of the data processing device 200. The method for adapting to blockchain may comprises:

Step S11, receiving a development requirement, which includes a blockchain communication requirement of a target blockchain and a target language to communicate with the target blockchain, wherein the target blockchain is one of a plurality of candidate blockchains that the data processing device 200 is in communication with and/or capable of communicating with via the COM ports 250; and Step S12, providing a software development kit (SDK) corresponding to the target language based on the development requirement, the SDK includes a calling interface corresponding to the development requirement, the calling interface is configured to trigger a communication channel to communicate with the target blockchain.

Wherein, the method for adapting to blockchain is applied in the application of blockchain technology and can be used to realize the communication with a plurality of candidate blockchains. For example, the target blockchain may be one blockchain in the plurality of candidate blockchains. Each candidate blockchain is in communication with the data processing device 200. The method may be used for the data transmission between the target blockchain and the data processing device 200 (e.g., a terminal device) that implements a blockchain application.

The blockchain may be a chained data structure in which data blocks are sequentially connected in a chronological order and may be a cryptographically guaranteed non-tamperable and unforgettable distributed ledger. A blockchain may include a public chain, a private chain, or a coalition chain.

The public chain may be a decentralized chain, and the data uploaded to the public chain cannot be tampered with. A private chain may be a private blockchain. It refers to a blockchain whose write permissions are entirely in the hands of an organization. All nodes participating in this blockchain are strictly controlled. A consortium blockchain refers to a blockchain in which several organizations or institutions participate in management. Each organization or institution controls one or more nodes to collectively record target data. And only these organizations and institutions may read, write, and send data to the chain.

In some embodiments, the public chain may be Ethereum (Eth), commercial distributed blockchain operating system (EOS), Hyperledger Fabric, etc., which is not limited herein.

The target language included in the development requirement may be a programming language used for developing the application development terminal in the application development, for example, a programming language determined in a programming language such as Java, GO, C. or C++.

In some embodiments, the SDK that provides the target language based on the development requirement may be a SDK selected from a plurality of candidate SDK stored in the data processing device 200 after confirming a target language of the development application; or may be a customed SDK generated after confirming the target language of the development terminal. For example, the SDK corresponding to the target language may be a Java SDK corresponding to Java or may be a GO SDK corresponding to GO, which may be according to requirements of the programming language in the development requirement and is not limited herein.

Further, the SDK may be a general SDK or a customized SDK corresponding to a specific service requirement, which may be determined according to requirement information for communication on the blockchain.

The general SDK may be generated before receiving the development requirement and provided according to the development information; the SDK corresponding to the specific service requirement may be a more targeted SDK generated according to the development requirement after receiving the development requirement.

Determining, according to the received development requirement, a SDK corresponding to the acquired development requirement, wherein the SDK corresponds to a target language in the development requirement, and the SDK provides a calling interface, which can implement the communication between the blockchains, and thus can improve the development efficiency of the application.

Figure 3:
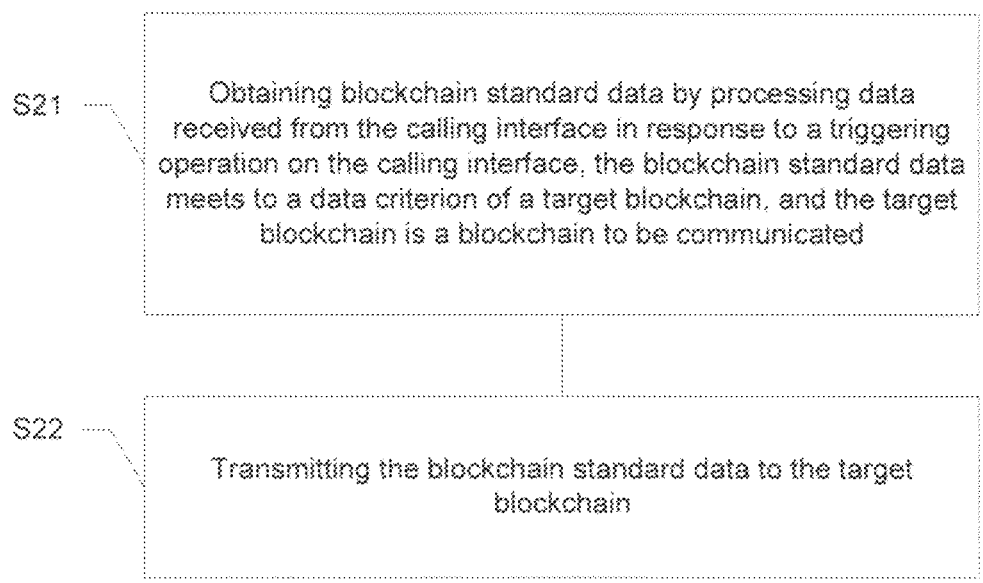
FIG. 3 is a partial flowchart of another method for adapting to blockchain according to embodiments of the present disclosure.

In the embodiment, the calling interface provided by the SDK can be used to perform data transmission with the blockchain. Referring to FIG. 3, the method for adapting to blockchain further includes:

Step S21, obtaining blockchain standard data by processing data received from the calling interface in response to a triggering operation on the calling interface, the blockchain standard data meets a data criterion of the target blockchain, and the target blockchain is a blockchain to be communicated; and Step S22, transmitting the blockchain standard data to the target blockchain.

In some embodiments, the processor of the data processing device 200 may receive a triggering operation on the calling interface. The triggering operation may be a received request operation, for example, may be a smart contract deployment, a smart contract call, a transaction request, or the like. In response, the processor of the data processing device 200 may receive data from the calling interface.

The target blockchain may be a blockchain that needs to be used and may be selected from blockchains such as ETH and EOS. The data criterion of the target blockchain may be the data requirement of the blockchain, for example, the data format supported by the blockchain and the transmission mode.

By processing the data received by the calling interface to obtain the blockchain standard data that meets the requirements of the target blockchain, the data received by the calling interface can be smoothly transmitted to the target blockchain. This conversion is done by development auxiliary tool to improve development efficiency.

Referring to FIG. 4, in the embodiment, the method for adapting to blockchain further comprises:

Step S31, parsing the triggering operation on the calling interface in response to the triggering operation and determining the target blockchain and blockchain communication requirement of the target blockchain, wherein the target blockchain is a blockchain to be communicated; and Step S32, calling an adapter corresponding to the target blockchain and conducting communication with the target blockchain, wherein the communication meets the communication requirement of the target blockchain.

The calling interface can be called by an application developed by the corresponding target blockchain, and the calling interface is triggered in response to an application call. By parsing the triggering operation, the target blockchain and the communication requirements for communicating with the target blockchain can be determined.

Specifically, the communication requirement may be a requirement to send to or receive data from the target blockchain and may include data to be transmitted to the target blockchain. The called interface can be an interface corresponding to different service requirements and can be a generic calling interface or a customized calling interface. The generic calling interface may be provided by the above-mentioned general SDK, and the customized calling interface may be provided by the above-mentioned SDK corresponding to a specific service requirement.

In the embodiment, according to the parsing result obtained by the parsing triggering operation, an adapter of the target blockchain corresponding to the parsing result is called to receive and transmit data through the adapter and the target blockchain.

The adapter may be an adapter corresponding to the blockchain and may communicate with the corresponding target blockchain through the adapter. For example, the ETH adapter can communicate with the ETH, and the EOS adapter can communicate with the EOS, The adapter corresponding to different target blockchains can convert the data acquired from the calling interface into standard data meeting the data criterion of the target blockchain, and the specific conversion and transmission mode can be determined according to the requirements of different target blockchains.

Figure 5:
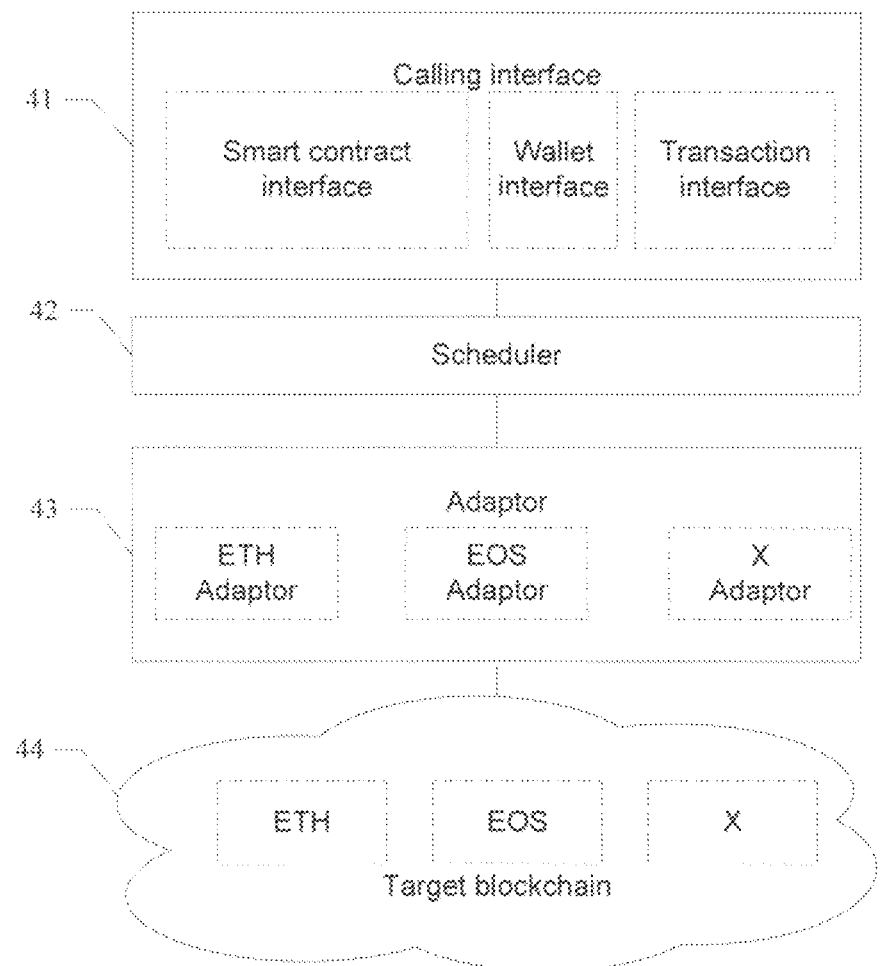
FIG. 5 is a partial structure diagram of a SDK according to embodiments of the present disclosure.

FIG. 5 is a partial structure diagram of a SDK according to embodiments of the present disclosure. The calling interface 41 can receive a triggering operation, and the scheduler 42 is connected to the calling interface 41 and can respond to the triggering operation received by the calling interface 41 to parse the target blockchain 44 corresponding to the triggering operation and the specific communication requirement. The target blockchain 44 corresponding to the triggering operation may be ETH, EOS, or other blockchain, and parsing the specific communication requirement of the triggering operation is to determine transmitting data or receiving data.

In the embodiment, the scheduler 42 is connected to the adapter 43. The scheduler 42 parses the triggering operation, obtains the target blockchain 44 corresponding to the triggering operation and the specific communication requirement, and then forwards the communication requirement to the adapter 43 of blockchain 44 corresponding target. For example, the target blockchain 44 is ETH and the scheduler 42 forwards the communication requirements to the adapter 43 of the corresponding ETH. The adapter 43 of the corresponding target blockchain 44 receives the communication requirements forwarded by the scheduler 42 and performs data transmission or reception with the target blockchain 44.

By parsing the triggering operation on the calling interface, determining the target blockchain and the communication requirement, and calling the adapter corresponding to the target blockchain to communicate, the data in the communication requirement can be transmitted to the target blockchain through the adapter and the quality of communication with the target blockchain can be improved.

As mentioned above, the SDK can be an existing SDK, or a SDK generated based on the selection of the target language. In the embodiment, the SDK may be generated according to the development requirement. If the development tool information is different, then the generated SDK is different. For example, the SDK corresponding to the smart contract information may be generated according to the information of the smart contract to be operated, or the SDK corresponding to the selected blockchain may be generated according to the selection operation of the blockchain, or a SDK corresponding to the target language may be generated according to the selection of the target language. Detailed description will be given below.

The SDK corresponding to the development requirement is generated according to the development requirement, so that the generated SDK is more conformity to the application development requirement, and the convenience of the subsequent use of the SDK can be improved, thereby improving the convenience of application development.

As described above, the development requirement may include a blockchain communication requirement and a target language. In the embodiment of the present invention, communicating with the blockchain may include information of a smart contract to be operated, and the SDK of the target language provided based on the development requirement may include a calling interface corresponding to the operation of the smart contract.

Wherein, the smart contract is a piece of code running on the blockchain, the logic of the code defines the content constrained by the smart contract, and the account of the contract retains the running state of the contract. In the embodiment of the present invention, the blockchains are different, then the smart contracts corresponding to the blockchains are different.

The information of the smart contract may be information corresponding to the blockchain of the smart contract, or the data interaction requirement of the smart contract. If the smart contracts are different, the corresponding smart contract information is different, and the calling interfaces corresponding to the operation of the smart contracts in the SDK are different.

In the embodiment, the information about the smart contract to be operated may include a data interaction requirement of the smart contract, and the method for adapting to the blockchain may further comprises: generating a smart contract template corresponding to the data interaction requirement of the smart contract, the smart contract template includes an input data field of the blockchain determined by the data interaction requirement, an output data field, and an operation name of the smart contract template.

The smart contract template may be generated by a smart contract template generator of the SDK described above, wherein the smart contract template may define an input data field and an output data field of the blockchain and an operation name of the smart contract template. For example, when the smart contract template that needs to be generated is a vote, the smart contract template may include an operation name of the smart contract template, such as "voting", and an input data field and an output data field that need to be associated with the blockchain, wherein different operation names correspond to different operations in the smart contract, such as "voting", "transaction", "transfer", etc., and the input data field of the blockchain may include a "voter" field and a "voting content" field, and the field received from the blockchain, i.e. the output field, may be a "success/fail" field.

In the embodiment, by providing a smart contract template, receiving a specific service content and generating a smart contract according to the specific service requirement, the development efficiency can be improved.

Further, the method for adapting to the blockchain may further comprises: operating the smart contract generated based on the smart contract template via a smart contract interface in response to a triggering operation on the smart contract interface, the smart contract interface is a calling interface corresponding to the operation of the smart contract interface.

In the embodiment, the smart contract generated according to the template may be deployed to a corresponding blockchain through a smart contract deployment interface. For example, if the generated smart contract is a smart contract corresponding to the ETH, the smart contract deployment interface is adopted. The smart contract is deployed to the ETH, and if the generated smart contract is a smart contract corresponding to the EOS, the smart contract is deployed to the EOS through the smart contract deployment interface.

In the embodiment, the smart contract deployed to the blockchain can be called through the smart contract calling interface. For example, when the smart contract corresponding to ETH is deployed to the ETH, the smart contract deployed to the ETH can be called through the smart contract calling interface.

The smart contract interface can be used to operate the smart contract generated by the smart contract template, thereby reducing the process in the smart contract generation operation and improving the efficiency of application development.

In another embodiment of the present invention, the blockchain communication requirement includes a target blockchain, and the providing the SDK corresponding to the target language based on the development requirement comprises: generating an adapter for communicating with the target blockchain.

As described above, the adapter may be an adapter one-to-one corresponding to the blockchain, and the type and number of adapters included in the SDK may be determined by information of the target blockchain 44 in blockchain communication requirement of the blockchain. Different adapters 43 are generated corresponding to different target blockchains 44. For example, if the target blockchain 44 is ETH, an adapter 43 corresponding to ETH is generated, and if the target blockchain 44 is EOS, and an adapter 43 corresponding to the EOS is generated.

Blockchain communication requirement of the blockchain includes the target blockchain, and the SDK includes an adapter for communicating with the target blockchain, which can make the SDK more targeted and reduce space occupied the SDK and improve the efficiency of generating SDKs.

Figure 6:
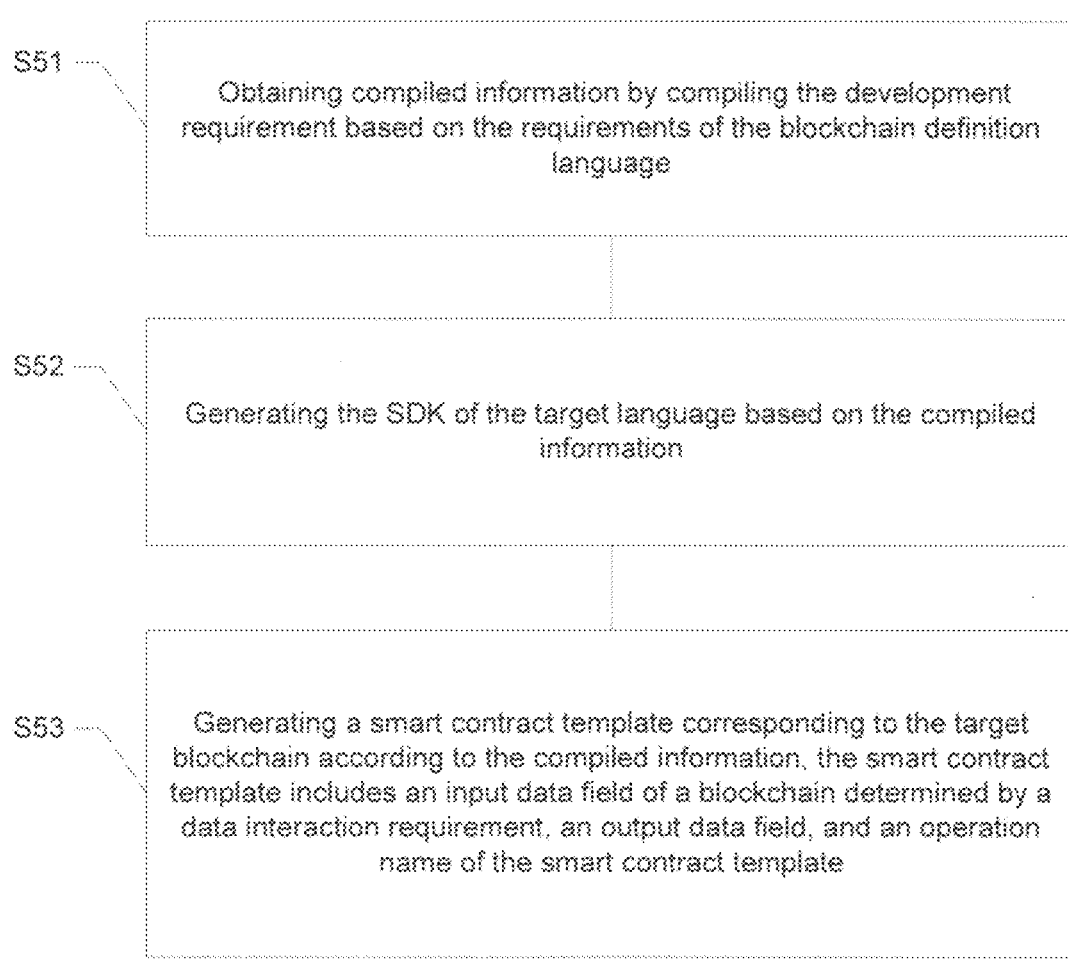
FIG. 6 is a flowchart of a method for generating a SDK according to embodiments of the present disclosure.

FIG. 6 is a flowchart of a method for generating a software tool development kit according to embodiments of the present disclosure. The development requirement may be written in a preset blockchain definition language, and the providing the SDK corresponding to the target language based on the development requirement comprises:

Step S51, obtaining compiled information by compiling the development requirement based on the requirements of the blockchain definition language;

Step S52: generating the SDK of the target language based on the compiled information.

The blockchain definition language may be a preset language, and the source file for supporting the SDK generator to generate the SDK can be written with the preset blockchain definition language on the development side. The source file written in the blockchain definition language can be compiled by the compiler to obtain compiled information, and the complied information can be a compiled file.

In the embodiment, if the source file written on the development side is not written according to the preset blockchain definition language, or there are other writing errors, the compiler can make an error prompt for requesting to revise the content which was not conformity to the blockchain definition language or written incorrectly.

The development requirement is compiled based on the requirements of the blockchain definition language, and the compiled information is obtained to generate a SDK for developing the application according to the compiled information. Therefore, the development requirement corresponding to different blockchains can be written in a unified language, and the development process can be accelerated, and the development efficiency can be improved compared to separately developing different blockchains.

In the embodiment, the information of the smart contract can also be written in the blockchain definition language, that is, the source file supporting the smart contract template generator can be written in the blockchain definition language. It can be understood that the source files used to support the SDK generator and the source files used to support the smart contract template generator may be the same source file or may be different source files.

Continue referring to FIG. 6, in the embodiment, the method for adapting to the blockchain further comprises: step S53, generating a smart contract template corresponding to the target blockchain according to the compiled information, the smart contract template includes an input data field of a blockchain determined by a data interaction requirement, an output data field, and an operation name of the smart contract template.

For example, when the smart contract template that needs to be generated is a "vote," the information of the smart contract may include the operation name of the smart contract template, such as "voting", and the input data field and the output data field that need to be associated with the blockchain, wherein the input data field of the blockchain may include a "Voter" field, a "Voting Content" field, a field received from the blockchain, that is, an output field may be a "success/fail" field. The above requirements of input data fields and the output data fields can be written in the blockchain development language.

In the embodiment, the generated compiled information may include information of a smart contract, and the smart contract template generator of the SDK may generate a smart contract template corresponding to the compiled information. After generating the smart contract template, the smart contract that generates corresponding smart contract template may be written according to a specific service content requirement.

By using the preset blockchain definition language to write the information of the smart contract, the smart contract template corresponding to the blockchain is generated, and the smart contract is generated based on the smart contract template, so that, corresponding to different blockchains, the preset blockchain definition language can be adopted to write the development requirement to improve development efficiency. The generated smart contract template is based on the requirement information and is more suitable for the service needs of the application.

Figure 7:
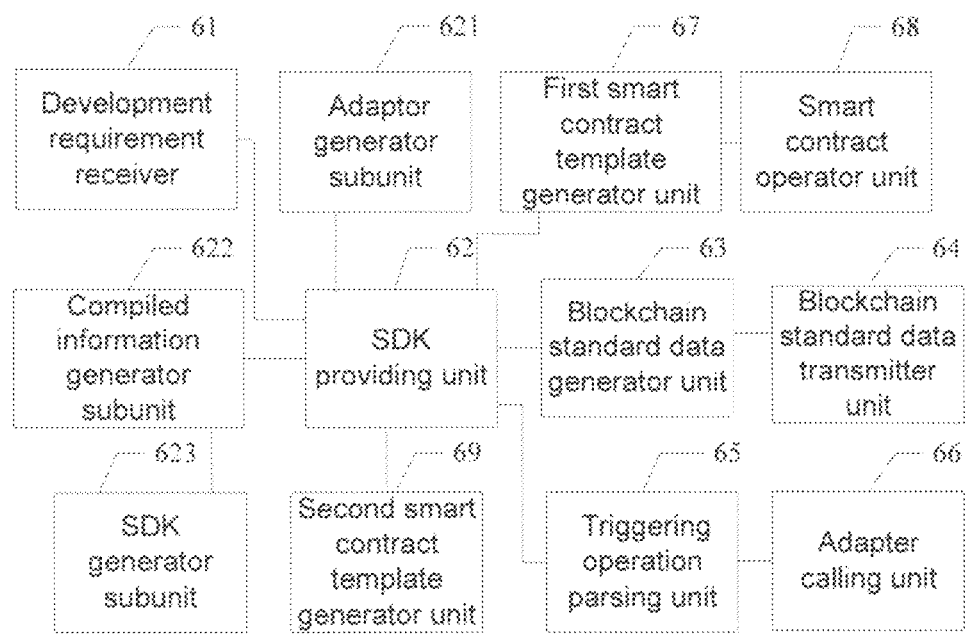
FIG. 7 is a structural diagram of a device for adapting to blockchain according to embodiments of the present disclosure.

One embodiment of the present invention further provides a device for adapting to a blockchain as shown in FIG. 7. The device may be the data processing device 200, which may be further divided to different portions observing from a different perspective view. The device comprising:

A development requirement receiver 61 unit configured to receive a development requirement, the development requirement includes a blockchain communication requirement and a target language; and A SDK providing unit 62 configured to provide a SDK corresponding to the target language based on the development requirement, the SDK includes a calling interface corresponding to the development requirement, the calling interface is configured to trigger a communication channel to communicate with the blockchain.

In the embodiment, the device for adapting to the blockchain may further comprises:

A blockchain standard data generator unit 63 configured to obtain blockchain standard data by processing data received from the calling interface in response to a triggering operation on the calling interface, the blockchain standard data meets to a data criterion of a target blockchain, and the target blockchain is a blockchain to be communicated; and A blockchain standard data transmitter unit 64 configured to transmit the blockchain standard data to the target blockchain.

In the embodiment, the device for adapting to the blockchain may further comprises:

A triggering operation parsing unit 65 configured to parse the triggering operation on the calling interface in response to a triggering operation and determine a target blockchain and communication requirement of the target blockchain, the target blockchain is a blockchain to be communicated; and An adapter calling unit 66 configured to call an adapter corresponding to the target blockchain and communicate with the target blockchain through the adapter to meet the communication requirement.

In the embodiment of the present invention, the blockchain communication requirement includes information of a smart contract to be operated; and the SDK of the target language provided based on the development requirement includes a calling interface corresponding to the operation of the smart contract.

Further, the information of the smart contract to be operated includes a data interaction requirement of the smart contract, and the device further comprises: a first smart contract template generator unit configured to generate a smart contract template corresponding to the data interaction requirement of the smart contract, the smart contract template includes an input data field of the blockchain determined by the data interaction requirement, an output data field, and an operation name of the smart contract template.

Further, the device for adapting to the blockchain further comprises: a smart contract operator unit 68 configured to operate the smart contract generated based on the smart contract template via a smart contract interface in response to a triggering operation on the smart contract interface, the smart contract interface is a calling interface corresponding to the operation of the smart contract interface.

In another embodiment of the present invention, blockchain communication requirement of the blockchain may include a target blockchain, and the SDK providing unit 62 may comprise: an adaptor generator subunit 621 configured to generate an adapter for communicating with the target blockchain.

In the embodiment, the development requirement is written in a preset blockchain definition language, the SDK providing unit 62 comprises:

A compiled information generator subunit 622 configured to compile the development requirement based on the requirements of the blockchain definition language and obtaining compiled information after being compiled; and A SDK generator subunit 623 configured to generate the SDK of the target language based on the compiled information.

Further, the development requirement further includes information of a smart contract, and the device further comprises: a second smart contract template generator unit 69 configured to generate a smart contract template corresponding to the blockchain according to the compiled information, the smart contract template includes an input data field of a blockchain determined by a data interaction requirement, an output data field, and an operation name of the smart contract template.

Figure 8:
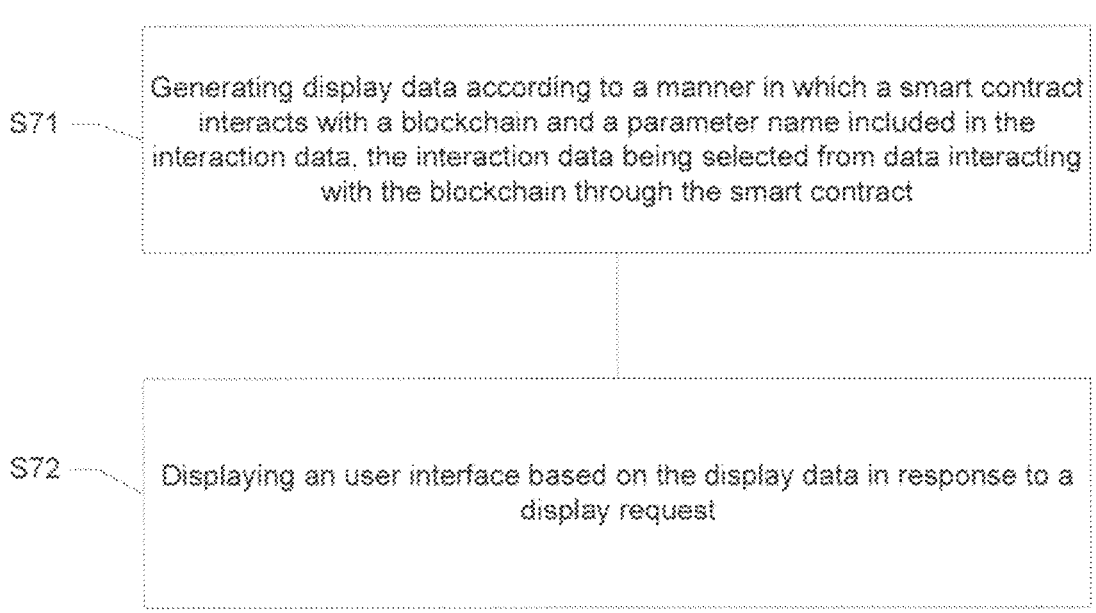
FIG. 8 is a flowchart of a data processing method according to embodiments of the present disclosure.

Referring to the flowchart of the data processing method as shown in FIG. 8, including:

Step S71, generating display data according to a manner in which a smart contract interacts with a blockchain and a parameter name included in the interaction data, the interaction data being selected from data interacting with the blockchain through the smart contract; and Step S72, displaying a user interface based on the display data in response to a display request.

In the embodiment, the smart contract interacting with the blockchain may include an interaction object of the smart contract interacting with the blockchain and a manner thereof. Wherein, the blockchain is different, and the interaction objects is different. For example, the blockchain may be ETH, the interactive object may a smart contract corresponding to ETH and ETH, and the blockchain may be an EOS, the interaction object may be a smart contract corresponding to EOS and EOS. The manner of interaction may correspond to a specific service, for example, it may be a transfer, a vote, a transaction, or the like. The interaction data may be data corresponding to the manner of the interaction, for example, interaction data corresponding to the transfer, or data corresponding to the vote, and the like.

In the embodiment, the interaction object and the manner of interaction may be determined by selecting a blockchain. For example, if ETH is selected, the interaction object may be determined to be a smart contract corresponding to ETH and ETH. Accordingly, the specific manner of the interaction has already been written into the smart contract of ETH, then the specific manner of the interaction can be determined via the smart contract.

The data interacting with the blockchain through the smart contract may also include the state of the smart contract interacting with the blockchain, for example, may be the success or failure of the operation, etc., which are not enumerated herein.

The interaction data may be all or part of the data in the data exchanged by the smart contract with the corresponding blockchain. In the embodiment, the data may be determined according to different application scenarios.

The display request may be a request triggered by the user to perform an operation on the client or may be a trigger operation on the preset control, or may be a request to carry more information, for example, may include a filtering request of the user, and a check request from the user to view the order log, or other request for the user to view the data exchanged by the smart contract with the blockchain. In the embodiment, the display data is presented through the user interface based on a user's display request.

The user interface may be an interface that allows the user to directly view the interface and may be a plurality of forms of the interface, which is not limited herein. In the embodiment, the user interface may be a display interface of the data transaction platform, the data transaction platform is a platform for the user to perform data transaction, and the data processing method may be run on the data transaction platform, and the user may use the display interface of the data transaction platform to view the display data displayed on the display interface. Those skilled in the art will appreciate that the user may include a data provider that provides the data, as well as a data demander that purchases the data.

According to the user's display request, the user interacts with the data of the smart contract and the blockchain through the user interface, and the user can view the data and actions of the smart contract and the blockchain displayed in the user interface, so that the user can view the smarter more intuitively. The record of the interaction between the contract and the blockchain can enhance the user experience.

In the embodiment, the display data displayed through the user interface may be generated in a plurality of manners, for example, may be data generated by data obtained from a log file, or obtained from a blockchain network address page. The data generated by the data, or other more generated data, will be described in detail below in conjunction with specific embodiments.

Figure 9:
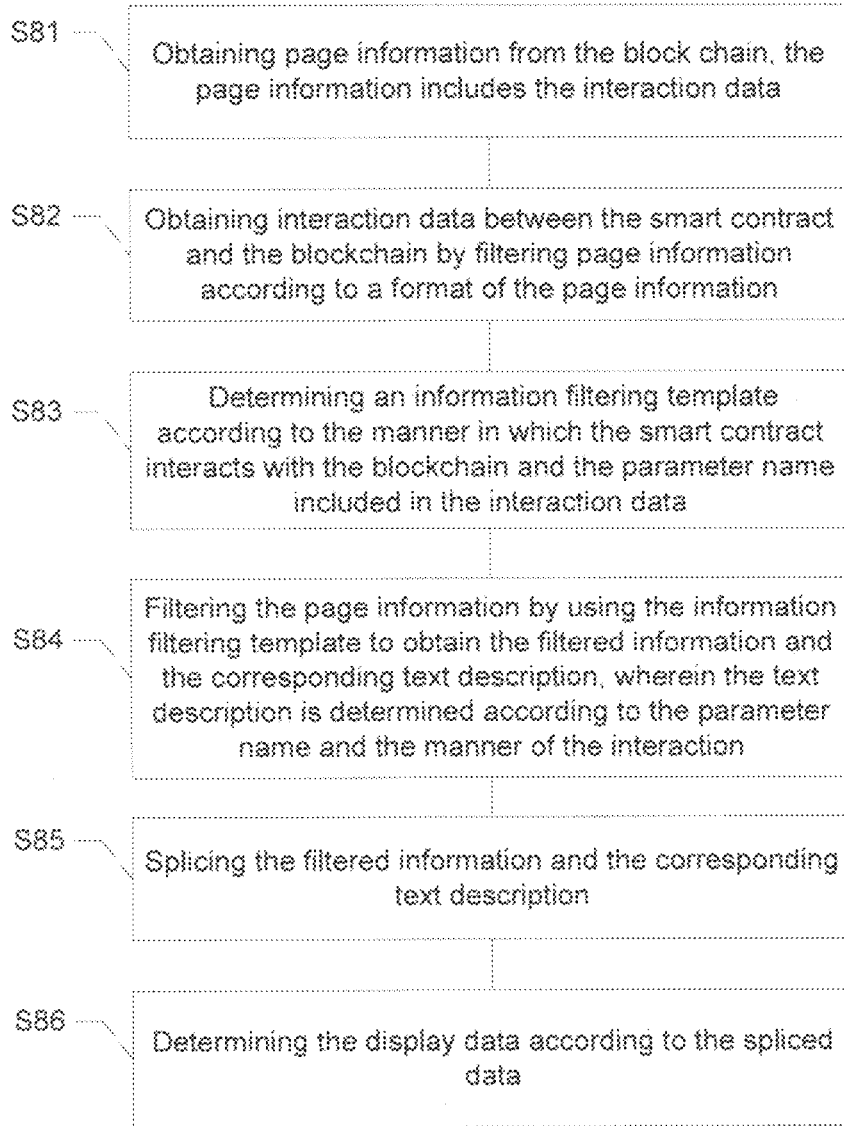
FIG. 9 is a flowchart of a method for generating display data according to embodiments of the present disclosure.

In the embodiment of the present invention, referring to FIG. 9, the method for generating display data according to the manner in which the smart contract interacts with the blockchain and the parameter name included in the interaction data may comprise:

Step S81, obtaining page information from the blockchain, the page information includes the interaction data;

Step S82, obtaining interaction data between the smart contract and the blockchain by filtering page information according to a format of the page information;

Step S83, determining an information filtering template according to the manner in which the smart contract interacts with the blockchain and the parameter name included in the interaction data;

Step S84, filtering the page information by using the information filtering template to obtain the filtered information and the corresponding text description, wherein the text description is determined according to the parameter name and the manner of the interaction;

Step S85, splicing the filtered information and the corresponding text description; and Step S86, determining the display data according to the spliced data.

The page information may be block information of a blockchain, for example, may be information of a certain block in the blockchain. Depending on the type of blockchain, for example, ETH, EOS, etc., the page information corresponding to the blockchain is different.

In the embodiment, the page information may be obtained according to the network address of the block of the blockchain. For different blockchains and different application scenarios, users can obtain network addresses in different ways. For example, the network address may be provided directly by the user, or the network address may be determined according to the information of the transaction order, or the network address may be obtained in other ways. It will be illustrated with specific embodiments as follows.

The parameter name may be a name corresponding to a specific data in the page information, such as "data price", "gas", "block time", etc., which are not enumerated herein.

The information filtering template may be a preset template, and the information filtering template may be associated with a blockchain and a specific smart contract, and the information filtering templates may be different corresponding to different blockchains and smart contracts, for example, corresponding to the blockchains, such as ETH, EOS, etc., the templates can vary depending on the display characteristics of the blockchain. Corresponding to the smart contracts with different interaction manners, such as the aforementioned smart contracts for transferring and smart contracts for voting, the information filtering templates may also be different, which is specifically determined by the parameters of the smart contract and the data needed to be interacted with the blockchain.

In the embodiment, the information that is filtered by using the information filtering template may be part of the information in the page information of the blockchain, and may be a specific time or cost information corresponding to the page information "data price", "gas", "block time", and the like., for example, "3000", "Nov.-15-2018, 02:37:47 PM" and other information.

The text description corresponding to the information obtained by the filtering may be a text description corresponding to a specific cost or a specific time. For example, the text description corresponding to "3000" may be "data fee." and a text description corresponding to "Nov.-15-2018, 02:37:47 PM" may be "block time." In the embodiment, the text description may further include a text description describing the user's contract operation for creating an order, etc., for explaining data interaction with the blockchain.

In the embodiment, the display data may be generated by processing the spliced data. For example, the filtered information and the corresponding text description may be spliced in a manner that is easy for the user to view or easy to read. In the embodiment, the determining the display data according to the spliced data may comprise: performing data check or semantic processing on the spliced data, or the like; or generating a plurality of different styles of data; or directly using the spliced data is as the display data, which is no limited herein.

By obtaining page information from the blockchain, determining the information filtering template according to the manner in which the smart contract interacts with the blockchain and the parameter name included in the interaction data, and filtering the page information by using the information filtering template, and determining the display data according to the filtered and spliced data, so the data interacting between the smart contract and the blockchain can be determined through the page information obtained from the blockchain, the display data can be generated based on the scenarios needs, and the flexibility is higher.

In the embodiment, the smart contracts may be different for different blockchains or different services. Smart contracts that are applied to specific service scenarios can be generated by smart contract templates based on specific service requirement, or by utilizing existing preset smart contracts. The preset smart contract may be a smart contract written by a third party, and the preset smart contract may interact with the corresponding blockchain.

In the embodiment, if the smart contract is a preset smart contract, the generating the display data according to the manner in which the smart contract interacts with the blockchain and a parameter name included in the interaction data further comprises: determining a manner in which the preset smart contract interacts with the blockchain and interaction data.

Specifically, the preset smart contract can be parsed, and the interaction between the preset smart contract and the corresponding blockchain and the interaction data can be determined through the parsing, so that the preset can be determined. The information filtering template of the smart contract can further filter the page information of the preset smart contract to determine the display data.

In the embodiment, the filtering the page information by using the information filtering template may include at least one of: filtering a state of the operation of interacting with the blockchain and a value corresponding to the parameter name.

The interacting operation between the blockchain and the smart contract may be various operations in the data transaction corresponding to the blockchain interaction, for example, for data transactions, it may be an order data uplink operation, or a payment operation. The status of the operation may be a successful or failed state in which the blockchain performs an interaction, for example, a status in which the order data is successfully uploaded to the blockchain or the order data is failed to be uploaded to the blockchain. It should be noted that the above is only an example and is not a limitation on the operation of interacting with the blockchain and the completion state.

Figure 10:
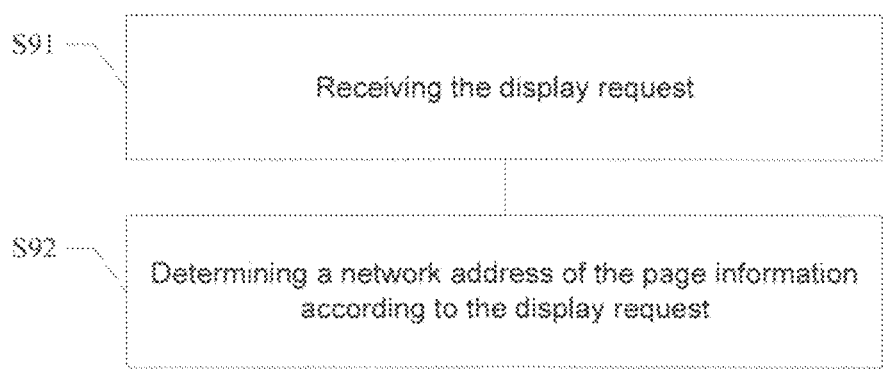
FIG. 10 is a flowchart of another data processing method according to embodiments of the present disclosure.

As described above, the display data is obtained based on the page information obtained from the blockchain. In the embodiment, referring to FIG. 10, the data processing method further comprises:

Step S91, receiving the display request;

Step S92, determining a network address of the page information according to the display request.

The network address may be an address corresponding to the page information in the blockchain and may be an address corresponding to each block in the blockchain.

Further, the display request is a request for viewing an order log, the display request includes order information; and determining, according to the display request, the network address of the page information comprises: obtaining the display request one or more network addresses corresponding to the order information.

The display request may be a request for viewing the order log by the user, and the order log determined by the order information may be viewed according to the order information in the display request. In the embodiment, the order information may include information corresponding to one or more blocks, and one or more network addresses corresponding to the page information may be determined according to the order information.

For example, when the user requests to view the order log, the data interacting between the smart contract and the blockchain may include data corresponding to the contract operation of creating the order by the user, the operation of confirming the order transaction by the user, the operation of confirming the successful transfer, and the like. According to the order information, a plurality of network addresses corresponding to the page information of the plurality of operations may be obtained, that is, a network address corresponding to the page information creating order, a network address corresponding to the page information confirming the order transaction, and a network address of the page information confirming the success transfer.

In the embodiment, the display request may include a network address of the page information.

As previously mentioned, the network address can be the address of each block in the corresponding blockchain. In this application scenario, the data processing method in the embodiment of the present invention may be provided by an application software, which may be used as a translation software for information on a blockchain. For example, the page information corresponding to the network address in the display request is obtained by the application software according to the display request of the user, and the data content translated by the application software is displayed through the interaction interface.

Figure 11:
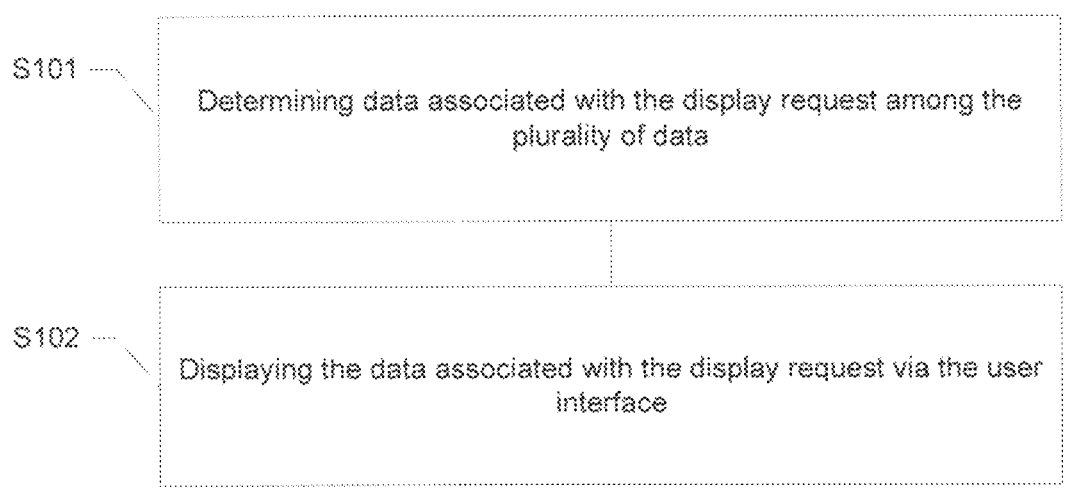
FIG. 11 is a flowchart of a method for displaying the display data according to embodiments of the present disclosure.

In another embodiment of the present invention, obtaining the page information from the blockchain comprises: obtaining the page information at a preset time point; the display data includes a plurality of data corresponding to the page information. Referring to FIG. 11, the displaying the user interface based on the display data in response to the display request comprises:

Step S101, determining data associated with the display request among the plurality of data; and Step S102, displaying the data associated with the display request via the user interface.

In the embodiment, the preset time point may be a time point that one interaction between the smart contract and the blockchain, for example, the order being uploaded to the blockchain serves as a time point, the user confirming the data transaction serves as a time point. Or a time point is preset based on a period, for example, one hour to get a page information. The display data may be a plurality of data corresponding to the page information acquired at a plurality of time points, for example, data of page information corresponding to the first hour, data of page information corresponding to the second hour, and the like.

Obtaining the page information at a preset time point, wherein the display data includes a plurality of data corresponding to the page information, and displaying data associated with the display request among the plurality of data based on the user's display request, thereby, the page information is obtained in advance, and user's request can be responded more efficiently compared to obtaining the page information after receiving the display request, thus reducing the waiting time of the user. Moreover displaying the data associated with the user's display request can make the displayed data more suitable for the user's requirements, and can improve the user experience.

In another embodiment of the present invention, the data transaction platform may obtain data interacting between the smart contract and the blockchain based on the default display requirement, and determine, when the user requests the data display, the data for display from the interaction data.

As described above, the display data displayed by the user interface may be a plurality of types of data, for example, displaying the data obtained from the log file can be displayed, or the data obtained from the blockchain network address page, or the data obtained by other more ways. In the embodiment of the present invention, the display data displayed by the user interface may be data obtained from the log file, for example, may be a system log file that executes the data processing method. The details will be described below with reference to FIG. 12.

Figure 12:
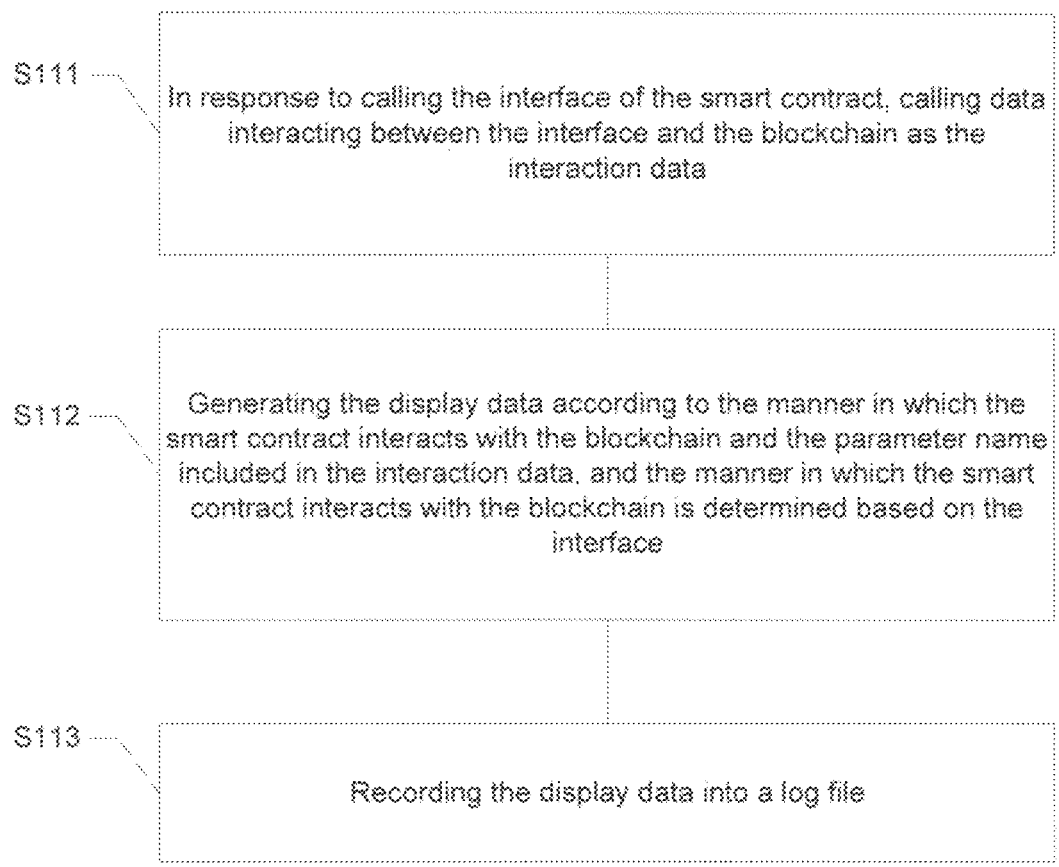
FIG. 12 is a flowchart of another method for generating the display data according to embodiments of the present disclosure.

Referring to FIG. 12, in the embodiment, the generating the display data according to the manner in which the smart contract interacts with the blockchain and the parameter name included in the interaction data comprises:

Step S111, in response to calling the interface of the smart contract, calling data interacting between the interface and the blockchain as the interaction data;

Step S112, generating the display data according to the manner in which the smart contract interacts with the blockchain and the parameter name included in the interaction data, and the manner in which the smart contract interacts with the blockchain is determined based on the interface; and Step S113, recording the display data into a log file.

In the embodiment, the displaying the user interface based on the display data in response to the display request comprises: obtaining data corresponding to the display request from the log file to perform display of the user interface.

In the embodiment, when the interface of the smart contract is called, the calling record is recorded in the log file. For example, the content of the record may be: "A user calls the transaction API in the smart contract at time 2108.12.13., to be uploaded to the blockchain;" After completing the calling on the interface of the smart contract, the result of the upload is recorded in the log file, for example, "the smart contract transaction api operation succeeds" and the like. Those skilled in the art will appreciate that the above is merely an example and is not a limitation on the contents of the log file and the manner of recording.

By recording the calling on interface of the smart contract and the data interacting with the blockchain through the log file, the network resource can be saved compared to generating the display data by obtaining information through the network. Further, obtaining, according to the display request of the user, the data corresponding to the display request from the log file to display the user interface, and directly obtaining data recorded by the log file and displaying the data can save time for data acquisition, and further improve the efficiency of data display and enhance the user experience.

As described above, the display request may be a request by the user to view the display data and a request that includes a plurality of different data content. In the embodiment of the present invention, the display request may include a request to view an order log, and the displaying the user interface based on the display data in response to the display request may include: determining, in the display data, data associated with the order to display.

In the embodiment, the display data may be data corresponding to multiple orders, and the data corresponding to the order in the display data may be triggered by the operation of the user by the user. Specifically, all the data of the order may be displayed, or part of the data of the order may be displayed, which may be determined according to the actual application scenario and is not limited herein.

Displaying the data associated with the order in the display data by displaying a request for viewing the order log in the request, and the user can determine the data to be displayed by selecting the order, so that the displayed data corresponds to the order, thereby making the displayed data more targeted and can enhancing the user experience.

In another embodiment of the present invention, the display request includes a filtering condition, the filtering condition includes at least one of: a time period, order information, blockchain information, manner information interacting with the blockchain, parameter name information, and parameter content information; the displaying the user interface based on the display data in response to the display request comprises: determining, in the display data, data associated with the filtering condition for display.

In the embodiment, the display data may be data including multiple orders or data interacting with different blockchains. In the embodiment, the user can determine the data to be displayed from the display data by using the filtering condition. For example, the data to be displayed is determined according to a specific time period for generating the transaction order or a specific time period for completing the transaction, or a data type of the transaction in the order information and a data amount, etc., or an information of the interacting blockchain, or the like. It should be noted that the description herein is merely an example and is not a limitation on the filtering conditions and the filtering methods.

The display data is filtered by the filtering conditions, and the data associated with the filtering conditions in the display data is displayed, so that the displayed data is more targeted and meet user requirements, thereby enhancing the user experience.

Figure 13:
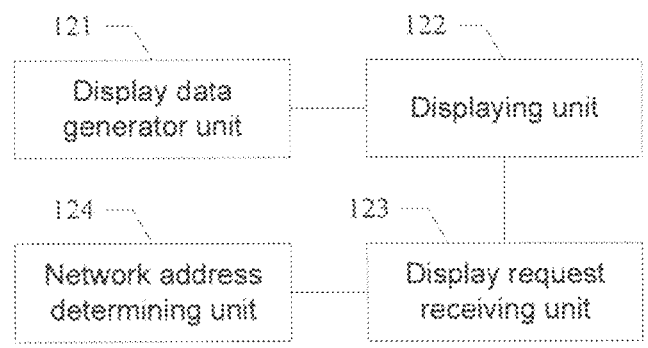
FIG. 13 is a structural diagram of a data processing device according to embodiments of the present disclosure.

The embodiment of the present invention further provides a data processing device, and a schematic structural diagram thereof is shown in FIG. 13, which may specifically comprise:

A display data generator unit 121 configured to generate display data according to a manner in which the smart contract interacts with the blockchain and a parameter name included in the interaction data, and the interaction data is selected from the data interacting with the blockchain through the smart contract; and A displaying unit 122 configured to display the user interface based on the display data in response to the display request.

Figure 14:
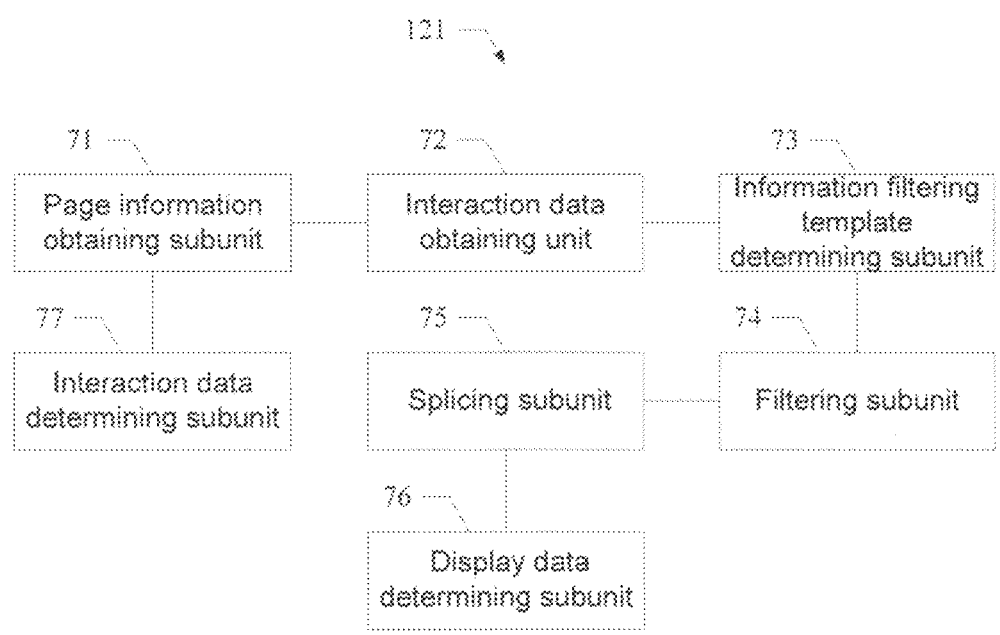
FIG. 14 is a structural diagram of a display data generator unit according to embodiments of the present disclosure.

Referring to FIG. 13 and FIG. 14, in the embodiment, the display data generator unit 121 may comprise:

A page information obtaining subunit 71 configured to obtain page information from the blockchain, the page information includes the interaction data;

An interaction data obtaining unit 72 configured to filter the page information based on the format of the page information to obtain interaction data between the smart contract and the blockchain;

An information filtering template determining subunit 73 configured to determine an information filtering template according to the manner in which the smart contract interacts with the blockchain and the parameter name included in the interaction data;

A filtering subunit 74 configured to filter the page information by using the information filtering template to obtain the filtered information and the corresponding text description, wherein the text description is determined according to the parameter name and the manner of the interaction;

A splicing subunit 75 configured to splice the filtered information and the corresponding text description;

A display data determining subunit 76 configured to determine the display data based on the spliced data.

In the embodiment, the smart contract may include a preset smart contract; the display data generator unit 121 may further comprise: an interaction manner and interaction data determining subunit 77 configured to determine the preset smart contract and the manner in which the blockchain interacts and the interaction data.

Further, the filtering subunit 74 may be configured to filter at least one of: a status of the operation of interacting with the blockchain and a value corresponding to the parameter name.

Continue referring to FIG. 13, in the embodiment, the data processing device may further comprise:

A display request receiving unit 123 configured to receive the display request;

A network address determining unit 124 configured to determine a network address of the page information according to the display request.

In the embodiment, the display request may be a request for viewing an order log, wherein the display request may include order information, and the network address determining unit 124 is configured to obtain one or more network addresses corresponding order information in the display request.

In another embodiment of the present invention, the display request may include a network address of the page information.

Figure 15:
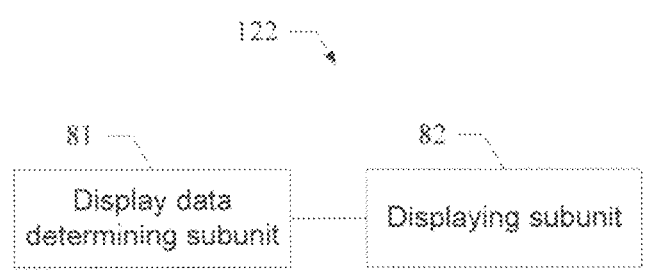
FIG. 15 is a structural diagram of a displaying unit according to embodiments of the present disclosure.

Referring to FIG. 13 to FIG. 15, in the embodiment, the page information obtaining subunit 71 is configured to obtain the page information at a preset time point, and the display data may include a plurality of data corresponding to the page information. The display unit 122 comprises:

A display data determining subunit 81 configured to determine data associated with the display request among the plurality of data;

A displaying subunit 82 configured to display data associated with the display request through the user interface.

Figure 16:
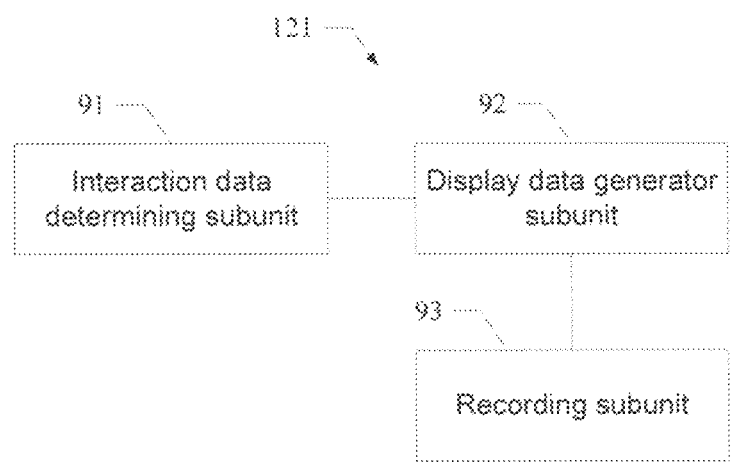
FIG. 16 is a structural diagram of another display data generator unit according to embodiments of the present disclosure.

Referring to FIG. 13 and FIG. 16, in the embodiment, the display data generator unit 121 includes:

An interaction data determining subunit 91 configured to, in response to calling the interface of the smart contract, calling data interacting between the interface and the blockchain as the interaction data;

A display data generator subunit 92 configured to generate the display data according to the manner in which the smart contract interacts with the blockchain and the parameter name included in the interaction data, and the manner in which the smart contract interacts with the blockchain is determined based on the interface; and A recording subunit 93 configured to record the display data into a log file.

In the embodiment, the displaying unit 122 is configured to obtain data corresponding to the display request from the log file to display the user interface.

In the embodiment of the invention, the display request may include a request to view an order log. The display unit 122 is configured to determine, in the display data, data associated with the order to display.

In another embodiment of the present invention, the display request includes a filtering condition, the filtering condition includes at least one of: a time period, order information, blockchain information, manner information interacting with the blockchain, parameter name information, and parameter content information. The display unit 122 is configured to determine, in the display data, data associated with the filtering condition for display.

The terminologies, working principles, specific implementations and beneficial effects of the device for adapting to the blockchain in the embodiment of the present invention may refer to the method for adapting to the blockchain in the embodiments of the present invention, which are not repeated herein.

The embodiment of the present invention further provides a computer readable storage medium having computer instructions stored thereon, wherein the computer instructions, when executed, perform the steps of the method for adapting to the blockchain. Refer to the foregoing embodiments for details, which are not described herein again.

The computer readable storage medium may be an optical disk, a mechanical hard disk, a solid-state hard disk, or the like.

The embodiment of the present invention further provides a terminal including a processor and a memory storing computer instructions thereon executable on the processor, wherein the computer instructions, when executed by the processor, perform the steps of the method for adapting to the blockchain. Refer to the foregoing embodiments for details, which are not described herein again.

The embodiment of the present invention further provides a terminal, which may include a memory and a processor, where the computer stores computer instructions capable of running on the processor, and the processor executes the adapting area when the computer instruction is executed by the processor For the steps of the method of the block chain, reference may be made to the foregoing embodiments, and details are not described herein again.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural components that do not differ from the literal language of the claims, or if they include equivalent structural components with insubstantial differences from the literal languages of the claims.

What may be claimed is:

1. A method for adapting to different types of blockchains, comprising:
receiving, by at least one processor, a development requirement including a blockchain communication requirement of a target blockchain selected from a plurality types of candidate blockchains associated with the at least one processor and a target language associated with the target blockchain, wherein the development requirement is written in a preset blockchain definition language, and further includes information of a smart contract;
providing, by the at least one processor, a software development kit (SDK) corresponding to the target language based on the development requirement, which includes:
obtaining compiled information by compiling the development requirement based on the requirements of the blockchain definition language,
generating; the SDK of the target language based on the compiled information, wherein the SDK includes a calling interface corresponding to the development requirement, the calling interface being configured to trigger a communication channel to communicate with the target blockchain; and
generating, by the at least one processor, a smart contract template corresponding to the target blockchain according to the complied information, the smart contract template including an input data field of the target blockchain determined by a data interaction requirement, an output data field, and an operation name of the smart contract template.

2. The method of claim 1, further comprising:
receiving, by the at least one processor, a triggering operation on the calling interface;
receiving, by the at least one processor, data from the calling interface in response to the triggering operation;
obtaining, by the at least one processor, blockchain standard data based on the data received from the calling interface, wherein the blockchain standard data meets a data criterion of the target blockchain; and
transmitting, by the at least one processor, the blockchain standard data to the target blockchain.

3. The method of claim 1, further comprising:
receiving, by the at least one processor, a triggering operation on the calling Interface;
determining, by the at least one processor, the target blockchain and the blockchain communication requirement to the target blockchain based on the triggering operation;
calling, by the at least one processor, an adapter corresponding to the target blockchain; and
conducting, by the at least one processor, with the target blockchain a communication that meets the communication requirement of the target blockchain.

4. The method of claim 1, wherein the blockchain communication requirement of the target blockchain includes Information of a smart contract to be operated, and
a calling interface corresponds to operations of the smart contract.

5. The method of claim 4, wherein the information of the smart contract includes a data interaction requirement of the smart contract, and the method further comprising:
generating, by the at least one processor, a smart contract template corresponding to the data interaction requirement, the smart contract template including an input data field of the target blockchain based on the data interaction requirement, an output data field, and an operation name of the smart contract template.

6. The method of claim 5, further comprising:
operating the smart contract via a smart contract interface in response to a triggering operation on the smart contract interface, the smart contract interface being a calling interface corresponding to the operation of the smart contract interface.

7. The method of claim 1, wherein the providing of the SDK corresponding to the target language based on the development requirement comprises: generating an adapter for communicating with the target blockchain.

8. A device, comprising:
at least one storage medium including a set of instructions for adapting to blockchains; and
at least one processor in communication with the at least one storage medium, wherein when executing the set of instructions, the at least one processor:
receives a development requirement including a blockchain communication requirement of a target blockchain selected from a plurality types of candidate blockchains associated with the at least one processor and a target language associated with the target blockchain wherein the development requirement is written in a preset blockchain definition language, and further includes information of a smart contract;
provides a software development kit (SDK) corresponding to the target language based on the development requirement, which includes:
obtaining compiled information by compiling the development requirement based on the requirements of the blockchain definition language,
generating the SDK of the target language based on the compiled information, wherein the SDK includes a calling interface corresponding to the development requirement, the calling interface being configured to trigger a communication channel to communicate with the target blockchain; and
generating, by the at least one processor, a smart contract template corresponding to the target blockchain according to the compiled information, the smart contract template including an input data field of the target blockchain determined by a data interaction requirement, an output data field, and an operation name of the smart contract template.

9. The device of claim 8, wherein the at least one processor further:
receives a triggering operation on the calling interface;
receives data from the calling interface in response to the triggering operation;
obtains blockchain standard data based on the data received from the calling interface, wherein the blockchain standard data meets a data criterion of the target blockchain; and
transmits the blockchain standard data to the target blockchain.

10. The device of claim 8, wherein the at least one processor further:
receives a triggering operation on the calling interface;
determines the target blockchain and the blockchain communication requirement of the target blockchain based on the triggering operation;
calls an adapter corresponding to the target blockchain; and
conducts with the target blockchain a communication that meets the communication requirement of the target blockchain.

11. The device of claim 8, wherein the blockchain communication requirement of the target blockchain includes information of a smart contract to be operated, and a calling interface corresponds to operations of the smart contract.

12. The device of claim 11, wherein the information of the smart contract includes a data interaction requirement of the smart contract, and
wherein the at least one processor further:
generates a smart contract template corresponding to the date interaction requirement, the smart contract template including an input data field of the target blockchain based on the data interaction requirement, an output data field, and an operation name of the smart contract template.

13. The device of claim 12, wherein the at least one processor further:
operates the smart contract via a smart contract interface in response to a triggering operation on the smart contract Interface, the smart contract interface being a calling interface corresponding to the operation of the smart contract interface.

14. The device of claim 8, wherein the providing of the SDK corresponding to the target language based on the development requirement includes: generating an adapter for communicating with the target blockchain.

15. A non-transitory storage medium, comprising a set of instructions for adapting to blockchains, wherein when the set of instructions is executed by a processor, the set of instructions directs the processor to conduct:
receiving a development requirement including a blockchain communication requirement of a target blockchain selected from a plurality types of candidate blockchains associated with the processor and a target language associated with the target blockchain, wherein the development requirement is written in a preset blockchain definition language, and further includes information of a smart contract;
providing a software development kit (SDK) corresponding to the target language based on the development requirement, which includes:
obtaining compiled information by compiling the development requirement based on the requirements of the blockchain definition language,
generating the SDK of the target language based on the compiled information, wherein the SDK includes a calling interface corresponding to the development requirement, the calling interface being configured to trigger a communication channel to communicate with the target blockchain; and
generating, by the at least one processor, a smart contract template corresponding to the target blockchain according to the compiled information, the smart contract template including an input data field of the target blockchain determined by a data interaction requirement, an output data field, and an operation name of the smart contract template.

16. The non-transitory storage medium of claim 15, wherein when the set of instructions is executed by a processor, the set of instructions further directs the processor to conduct:
  receiving a triggering operation on the calling interface;
  receiving data from the calling interface in response to the triggering operation;
  obtaining blockchain standard data based on the data received from the calling interface, wherein the blockchain standard data meets a data criterion of the target blockchain; and
  transmitting the blockchain standard data to the target blockchain.

\* \* \* \* \*